(12) United States Patent  
Zhang et al.

(10) Patent No.: US 11,498,140 B2  
(45) Date of Patent: Nov. 15, 2022

(54) TOOTH GROOVE MACHINING METHOD AND TOOTH GROOVE MACHINING DEVICE

(71) Applicant: JTEKT CORPORATION, Kariya (JP)

(72) Inventors: Lin Zhang, Nagoya (JP); Hisashi Otani, Anjo (JP); Hiroyuki Nakano, Tokai (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/998,015

(22) Filed: Aug. 20, 2020

(65) Prior Publication Data

US 2021/0053130 A1 Feb. 25, 2021

(30) Foreign Application Priority Data

Aug. 21, 2019 (JP) .............................. JP2019-151173

(51) Int. Cl.  
*B23F 1/06* (2006.01)

(52) U.S. Cl.  
CPC ....................................... *B23F 1/06* (2013.01)

(58) Field of Classification Search  
CPC .................................. B23F 5/163; B23F 1/06  
See application file for complete search history.

(56) References Cited

U.S. PATENT DOCUMENTS

| 2016/0129511 A1 | 5/2016 | Otani et al. |
| 2018/0126472 A1 | 5/2018 | Zhang et al. |
| 2019/0024729 A1 | 1/2019 | Zhang et al. |
| 2019/0217406 A1* | 7/2019 | Zhang ................ B23F 1/06 |
| 2020/0086408 A1* | 3/2020 | Nakano ............... B23F 5/163 |

FOREIGN PATENT DOCUMENTS

| JP | 2016-93882 A | 5/2016 |
| JP | 2018-79558 A | 5/2018 |
| JP | 2019-18334 A | 2/2019 |
| JP | 2019-18335 A | 2/2019 |

\* cited by examiner

*Primary Examiner* — Moshe Wilensky  
*Assistant Examiner* — Kyle A Cook  
(74) *Attorney, Agent, or Firm* — Oblon, McClelland, Maier & Neustadt, L.L.P.

(57) ABSTRACT

A tooth groove machining method includes: defining a shift angle as a phase correction angle in skiving when shifting a reference point of a predetermined tooth groove of a workpiece in a circumferential direction of the workpiece; machining a first tooth side surface by the skiving with a gear cutting tool, by setting an intersection angle to a predetermined intersection angle, and by setting the phase correction angle to a first phase correction angle; and machining a second tooth side surface by the skiving with the same gear cutting tool as the gear cutting tool that machined the first tooth side surface, by setting the intersection angle to be the same with the predetermined intersection angle, and by setting the phase correction angle to a second phase correction angle different from the first phase correction angle.

5 Claims, 20 Drawing Sheets

| SPECIFICATIONS OF TOOTH SURFACE | |
|---|---|
| RIGHT TOOTH SURFACE GSR | TAPER ANGLE $\Phi_R + 3°$ |
| LEFT TOOTH SURFACE GSL | TAPER ANGLE $\Phi_L + 3°$ |
| REFERENCE TOOTH GROOVE GB | REFERENCE ANGLE $\psi$ (MEDIAN) $0°$ |

FIG. 10C

| | | FIRST EXAMPLE/SECOND EXAMPLE | FIRST COMPARATIVE EXAMPLE | | SECOND COMPARATIVE EXAMPLE |
|---|---|---|---|---|---|
| TOOL TYPE | | COMMON | LEFT USING | RIGHT USING | COMMON |
| RIGHT TOOTH SURFACE GSR (TAPER ANGLE $\Phi_R+3°$) | INTERSECTION ANGLE $\theta$ | 20° | 20° | | 3° |
| | TOOL HELIX ANGLE $\beta$ | 20° | 23° | | 0° |
| | PHASE CORRECTION ANGLE | A1+α1 (A1=0) | B (B≠0) | | C (C≠0) |
| LEFT TOOTH SURFACE GSL (TAPER ANGLE $\Phi_L-3°$) | INTERSECTION ANGLE $\theta$ | 20° | | -20° | -3° |
| | TOOL HELIX ANGLE $\beta$ | 20° | | -23° | 0° |
| | PHASE CORRECTION ANGLE | A1-α2 (A1=0, α1=α2) | | -B (B≠0) | -C (C≠0) |

| SPECIFICATIONS OF TOOTH SURFACE | |
|---|---|
| RIGHT TOOTH SURFACE GSR | TAPER ANGLE $\Phi_R + 3°$ |
| LEFT TOOTH SURFACE GSL | TAPER ANGLE $\Phi_L - 2°$ |
| REFERENCE TOOTH GROOVE GB | REFERENCE ANGLE $\psi$ (MEDIAN) +0.5° |

FIG. 11C

| | | FIRST EXAMPLE/SECOND EXAMPLE | | FIRST COMPARATIVE EXAMPLE | | SECOND COMPARATIVE EXAMPLE |
|---|---|---|---|---|---|---|
| TOOL TYPE | | COMMON | | LEFT USING | RIGHT USING | COMMON |
| RIGHT TOOTH SURFACE GSR (TAPER ANGLE $\Phi_R+3°$) | INTERSECTION ANGLE $\theta$ | 20.5° | 20° | 20° | | 3° |
| | TOOL HELIX ANGLE $\beta$ | 20.5° | 20° | 23° | | 0° |
| | PHASE CORRECTION ANGLE | A2+α3 (A2≠0) | A3+α5 (A3=0) | E (E≠0) | | G (G≠0) |
| LEFT TOOTH SURFACE GSL (TAPER ANGLE $\Phi_L-2°$) | INTERSECTION ANGLE $\theta$ | 20.5° | 20° | | -20° | -2° |
| | TOOL HELIX ANGLE $\beta$ | 20.5° | 20° | | -22° | 0° |
| | PHASE CORRECTION ANGLE | A2-α4 (A2≠0, α3=α4) | A3-α6 (A3=0, α5≠α6) | | -F (F≠0) | -H (H≠0) |

TOOTH GROOVE MACHINING METHOD AND TOOTH GROOVE MACHINING DEVICE

CROSS-REFERENCE TO RELATED APPLICATIONS

This application is based on and claims priority under 35 USC 119 from Japanese Patent Application No. 2019-151173 filed on Aug. 21, 2019, the contents of which are incorporated herein by reference.

TECHNICAL FIELD

The present disclosure relates to a tooth groove machining method and a tooth groove machining device for machining a tooth groove.

BACKGROUND ART

JP2019-018335A, JP2016-093882A, JP2019-018334A and JP2018-079558A describe a tooth groove machining method and a tooth groove machining device in which tooth groove machining of an internal gear of a sleeve in a synchromesh mechanism of a transmission used in a vehicle is performed by skiving. The skiving can also be applied to tooth groove machining of an external gear of a synchronous cone in the synchromesh mechanism. Left and right tooth side surfaces of a tooth groove in the external gear of the synchronous cone are formed in a tapered shape that is left-right symmetrical in a tooth trace direction. That is, a distance between adjacent tooth side surfaces that face each other increases in an axial direction.

When the tooth groove machining of the external gear of the synchronous cone is performed by skiving, the right tooth side surface is machined by a gear cutting tool for a right tooth side surface, and the left tooth side surface is machined by a gear cutting tool for a left tooth side surface. In this case, since two types of gear cutting tools are required, the tool cost tends to increase. Further, a machining error may be generated due to tool exchange from the gear cutting tool for a right tooth side surface to the gear cutting tool for a left tooth side surface. Further, when the machining of the right tooth side surface is shifted to the machining of the left tooth side surface, it is necessary to change an intersection angle in the tooth groove machining (an angle at which a parallel line of a central axis of a workpiece intersects with a central axis of the tool), which tends to increase the tact time.

It is also considered to machine the tapered right tooth side surface and left tooth side surface of the tooth groove in the external gear of the synchronous cone with one type of gear cutting tool. As described above, when machining is performed by different gear cutting tools in the left and right tooth side surfaces, tool helix angles of the respective gear cutting tools can be set to different angles. However, when the machining is performed with one type of gear cutting tool, the tool helix angle of the gear cutting tool is set to 0°.

Here, in the external gear of the synchronous cone, in order to smoothly perform meshing and meshing release of the internal gear of the sleeve, taper angles of the right tooth side surface and the left tooth side surface of the tooth groove are set to relatively small angles. Therefore, when the machining is performed with one type of gear cutting tool, a common tool helix angle of 0° is used, so that the intersection angle is an angle corresponding to the taper angle with a small degree, and the intersection angle is set to a relatively small angle due to the taper angle. Further, when the intersection angle is small, a cutting speed of the gear cutting tool is reduced, and the tool wear may be increased. Even with this gear cutting tool, when the machining of the right tooth side surface is shifted to the machining of the left tooth side surface, a change of the intersection angle is required, so that tact time tends to increase.

SUMMARY OF INVENTION

The present disclosure provides a tooth groove machining method and a tooth groove machining device capable of machining a tooth groove with one type of gear cutting tool while ensuring a sufficient large intersection angle even when a taper angle of the tooth groove is small, and further capable of machining facing tooth side surfaces of the tooth groove without changing the intersection angle.

According to an illustrative aspect of the present disclosure, a tooth groove machining method for machining a tooth groove on a workpiece by skiving with a gear cutting tool, the workpiece being configured such that: a first tooth side surface of the tooth groove includes a first taper angle with respect to a parallel line of a central axis of the workpiece; and a second tooth side surface of the tooth groove facing the first tooth side surface includes a second taper angle different from the first taper angle, includes defining a shift angle as a phase correction angle in the skiving when shifting a reference point of a predetermined tooth groove of the workpiece in a circumferential direction of the workpiece; machining the first tooth side surface by the skiving with the gear cutting tool, by setting an intersection angle between a parallel line of the central axis of the workpiece and a central axis of the gear cutting tool to a predetermined intersection angle, and by setting the phase correction angle to a first phase correction angle; and machining the second tooth side surface by the skiving with the same gear cutting tool as the gear cutting tool that machined the first tooth side surface, by setting the intersection angle to be the same with the predetermined intersection angle, and by setting the phase correction angle to a second phase correction angle different from the first phase correction angle.

According to another illustrative aspect of the present disclosure, a tooth groove machining device for machining a tooth groove on a workpiece by skiving with a gear cutting tool, the workpiece being configured such that: a first tooth side surface of the tooth groove includes a first taper angle with respect to a parallel line of a central axis of the workpiece; and a second tooth side surface of the tooth groove facing the first tooth side surface includes a second taper angle different from the first taper angle, in which a shift angle is defined as a phase correction angle in the skiving when a reference point of a predetermined tooth groove of the workpiece is shifted in a circumferential direction of the workpiece, includes a controller. The controller is configured to: machine the first tooth side surface by the skiving with the gear cutting tool, by setting an intersection angle between a parallel line of the central axis of the workpiece and a central axis of the gear cutting tool to a predetermined intersection angle, and by setting the phase correction angle to a first phase correction angle; and machine the second tooth side surface by the skiving with the same gear cutting tool as the gear cutting tool that machined the first tooth side surface, by setting the intersection angle to be the same with the predetermined intersection angle, and by setting the phase correction angle to a second phase correction angle different from the first phase correction angle.

According to the tooth groove machining method and the tooth groove machining device of the present disclosure, when the first tooth side surface of the tooth groove is machined, the reference point of the first tooth side surface is shifted in the circumferential direction of the workpiece by the first phase correction angle, and when the second tooth side surface is machined, the reference point of the second tooth side surface is shifted in the circumferential direction of the workpiece by the second phase correction angle. Thus, even when the taper angle of the tooth groove is small, the machining can be performed with one type of gear cutting tool while ensuring a sufficient large intersection angle. Therefore, the tool wear can be reduced, and the tool cost can be reduced. Further, the facing tooth side surfaces of the tooth groove can be machined without changing the intersection angle. Therefore, the tact time can be reduced.

BRIEF DESCRIPTION OF DRAWINGS

FIG. 10C is a table comparing machining conditions when the shape of FIG. 10A is subjected to groove machining in the present embodiment and related-art examples.

FIG. 11C is a table comparing machining conditions when the shape of FIG. 11A is subjected to groove machining in the present embodiment and related-art examples.

DESCRIPTION OF EMBODIMENTS (1. Configuration of Tooth Groove Machining Device 10)

Figure 1:
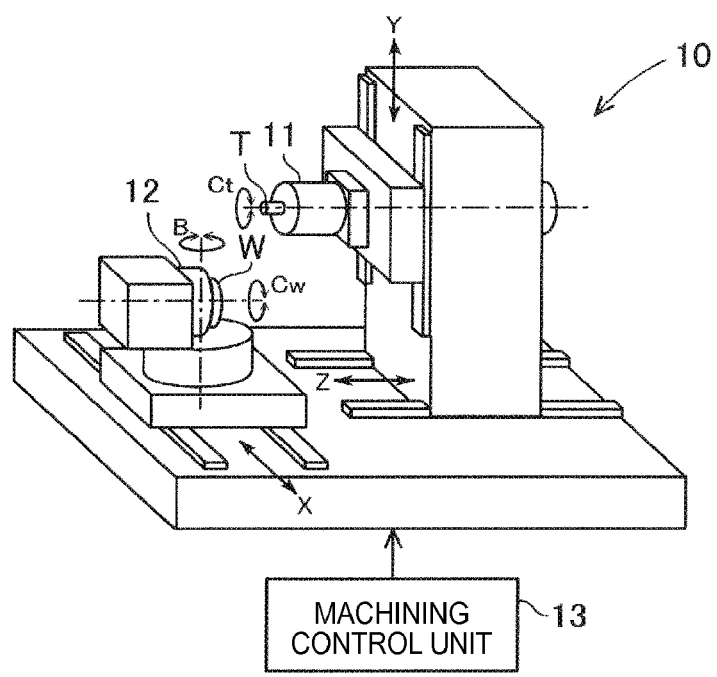
FIG. 1 is a diagram showing a configuration of a tooth groove machining device.

A configuration of a tooth groove machining device will be described with reference to FIG. 1. As shown in FIG. 1, a tooth groove machining device 10 is, for example, a five-axis machining center having three linear motion axes and two rotation axes, as driving axes for changing a relative position between a workpiece W and a gear cutting tool T and postures thereof.

In the present example, the tooth groove machining device 10 has three orthogonal axes (an X axis, a y axis, and a z axis) as linear motion axes, and a B axis and a Cw axis as rotation axes. In the present example, the B axis is a rotation axis around the Y axis, and the Cw axis is a rotation axis around a central axis of the workpiece W. The tooth groove machining device 10 has a Ct axis which is a rotation axis around a central axis of the gear cutting tool T, and is a 6-axis machining center when the Ct axis is provided.

The tooth groove machining device 10 includes a tool spindle 11 that supports the gear cutting tool T to be rotatable around the Ct axis and that is movable in a Y-axis direction and a Z-axis direction. Further, the tooth groove machining device 10 includes a workpiece spindle 12 that supports the workpiece W to be rotatable around the Cw axis, that is rotatable around the B axis, and that is movable in an X-axis direction.

The tooth groove machining device 10 includes a machining control unit 13 and the like that controls an operation of machining of a tooth groove. In the present example, the machining control unit 13 performs control such that the tooth groove is machined on the workpiece W by skiving. The tooth groove machining device 10 is not limited to the above configuration, and the tool spindle 11 and the workpiece spindle 12 may be configured to be movable relative to each other.

(2. Skiving)

Figure 2A:
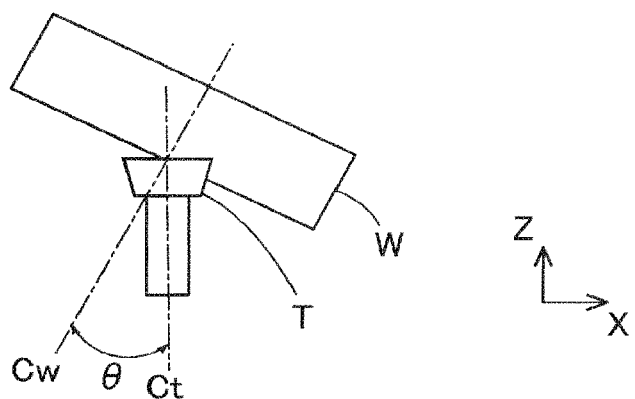
FIG. 2A is a diagram of a workpiece and a gear cutting tool during skiving when an intersection angle is set, as viewed in a radial direction of the gear cutting tool.
Figure 2B:
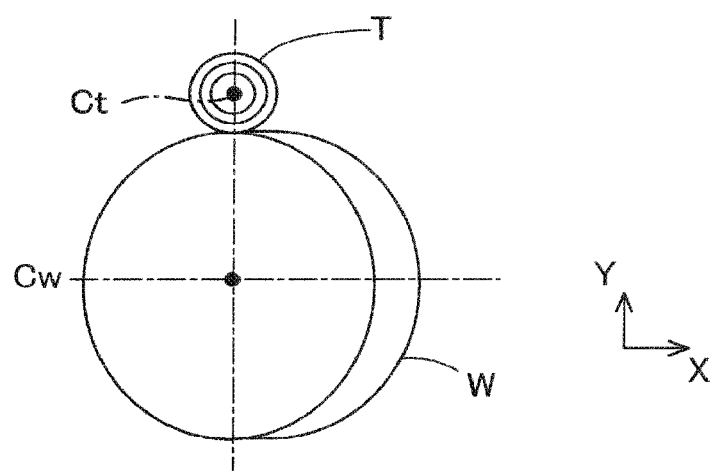
FIG. 2B is a diagram of FIG. 2A as viewed in a direction of a central axis of the gear cutting tool.

The skiving will be described with reference to FIG. 2A, FIG. 2B, FIG. 3A, and FIG. 3B. In the skiving, as shown in FIGS. 2A and 2B, the central axis Ct of the gear cutting tool T and an axis parallel to the central axis Cw of the workpiece W form an intersection angle θ. When viewed in the X-axis direction, the central axis Ct of the gear cutting tool T is parallel to the central axis Cw of the workpiece W.

Figure 3A:
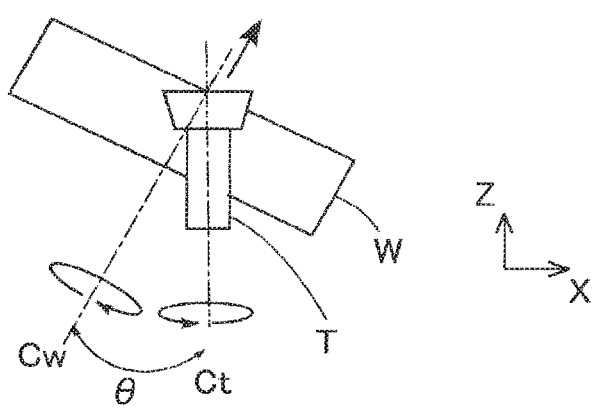
FIG. 3A is a diagram showing a skiving operation, as viewed in the radial direction of the gear cutting tool.
Figure 3B:
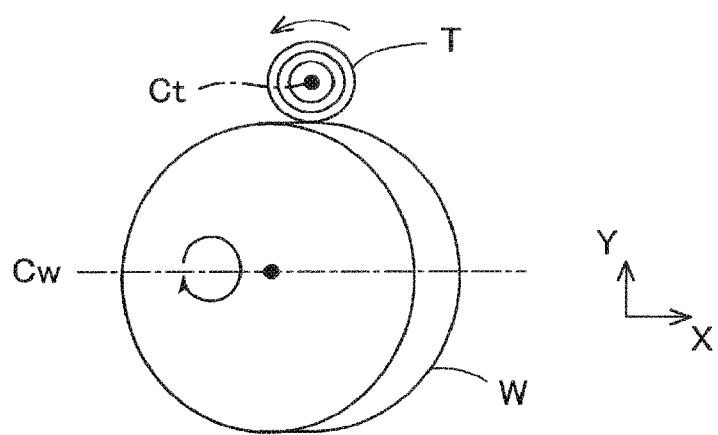
FIG. 3B is a diagram of FIG. 3A as viewed in a direction of the central axis of the gear cutting tool.

Further, there is known a method in which, as shown in FIGS. 3A and 3B, the gear cutting tool T is sent toward the workpiece W in a direction of the central axis Cw of the workpiece W while synchronizing rotation (clockwise in the figure) of the workpiece W around the central axis Cw of the workpiece W and rotation (counterclockwise in the figure) of the gear cutting tool T around the central axis Ct of the gear cutting tool T, and thus the tooth groove is machined on the workpiece W. In the skiving, each tooth groove portion of the workpiece W is machined only once by the gear cutting tool T while the workpiece W rotates once.

(3. Workpiece W)

Figure 4A:
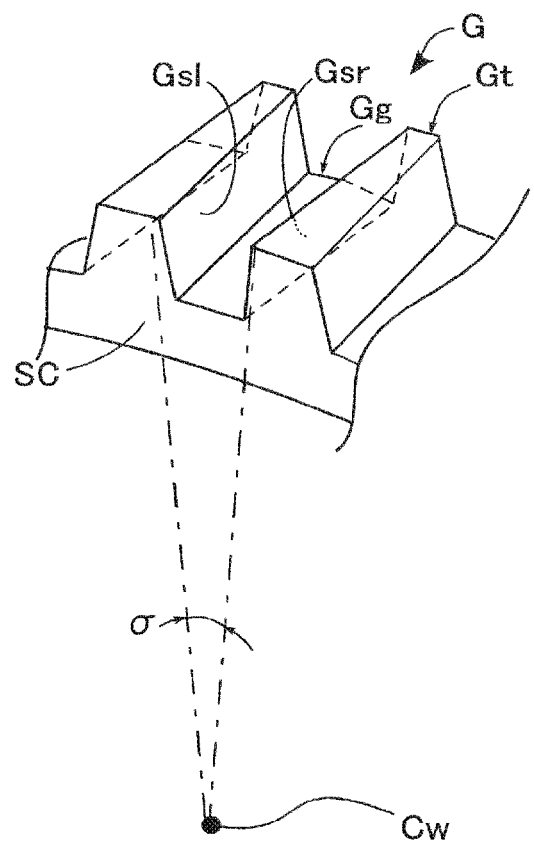
FIG. 4A is a view showing a part of an external gear of a synchronous cone formed by skiving.
Figure 4B:
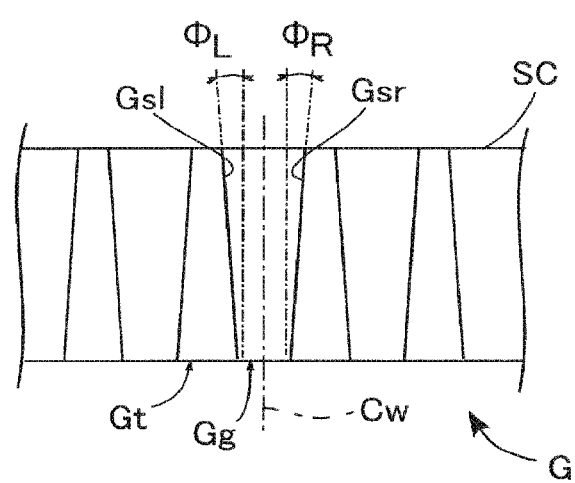
FIG. 4B is a view of FIG. 4A as viewed in a radial direction of the external gear.

A case will be described as an example in which tooth groove machining of an external gear G of a common synchronous cone SC partially shown in FIGS. 4A and 4B used in a synchromesh mechanism of a transmission of an automobile is performed in the tooth groove machining device 10 of the present example by skiving. The external gear G of the synchronous cone SC mesh with an internal gear of a sleeve (not shown), and tooth grooves Gg (teeth Gt) of the external gear G of the synchronous cone SC are formed in a tapered shape to prevent gear loose-out.

That is, a right tooth side surface Gsr (a first tooth side surface, or a first tooth flank) and a left tooth side surface Gsl (a second tooth side surface, or a second tooth flank) of the tooth groove Gg of the external gear G of the synchronous cone SC are formed in a tapered shape left-right symmetrical with respect to a parallel line of the central axis Cw. Further, a taper angle $\Phi_R$ (a first taper angle) of the right tooth side surface Gsr of the tooth groove Gg with respect to a parallel line of the central axis Cw and a taper angle $\Phi_L$ (a second taper angle) of the left tooth side surface Gsl with respect to a parallel line of the central axis Cw are relatively small angles (for example, 3°) in order to smoothly release the above meshing. The right tooth side surface Gsr and the left tooth side surface Gsl of the tooth groove Gg are separated by an angle σ around the central axis Cw of the workpiece W.

In the following description, the angles of the right tooth side surface Gsr and the left tooth side surface Gsl in a clockwise direction with respect to a parallel line of the central axis Cw are positive and in a counterclockwise direction are negative. Therefore, as shown in FIG. 4B, when a tapered side of the tapered tooth groove Gg is positioned on a lower side of the drawing, the right tooth side surface Gsr is inclined in the clockwise direction with respect to a parallel line of the central axis Cw, and therefore the taper angle $\Phi_R$ of the right tooth side surface Gsr is positive. Since the left tooth side surface Gsl is inclined in the counterclockwise direction with respect to a parallel line of the central axis Cw, the taper angle $\Phi_L$ of the left tooth side surface Gsl is negative.

The shape of the tooth groove Gg that can be machined by the tooth groove machining device 10 of the present example is not limited to a tapered shape that is left-right symmetrical with respect to a parallel line of the central axis Cw (a shape in which the taper angle $\Phi_R$ of the right tooth side surface Gsr with respect to a parallel line of the central axis Cw and the taper angle $\Phi_L$ of the left tooth side surface Gsl with respect to a parallel line of the central axis Cw have the same absolute value but are different in positive and negative), and may be a tapered shape that is left-right asymmetrical with respect to a parallel line of the central axis Cw (a shape in which the taper angle $\Phi_R$ of the right tooth side surface Gsr with respect to a parallel line of the central axis Cw and the taper angle $\Phi_L$ of the left tooth side surface Gsl with respect to a parallel line of the central axis Cw have different absolute values and are different in positive and negative).

(4. Gear Cutting Tool T)

Figure 5A:
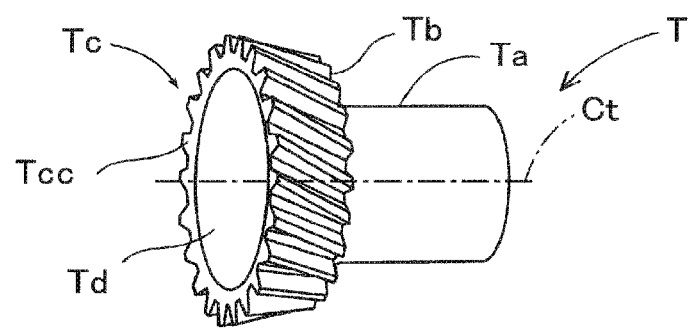
FIG. 5A is a view showing the gear cutting tool.

As shown in FIG. 5A, a tool blade Tc of the gear cutting tool T has a truncated cone shape having a plurality of blades Tcc on outer circumference thereof, and a tool shaft Ta of the gear cutting tool T is formed as an integral part on a small diameter end side surface Tb. A shape of the blade Tcc on a large diameter end side surface Td of the tool blade Tc of the gear cutting tool T is formed in an involute curve shape in the present example.

Figure 5B:
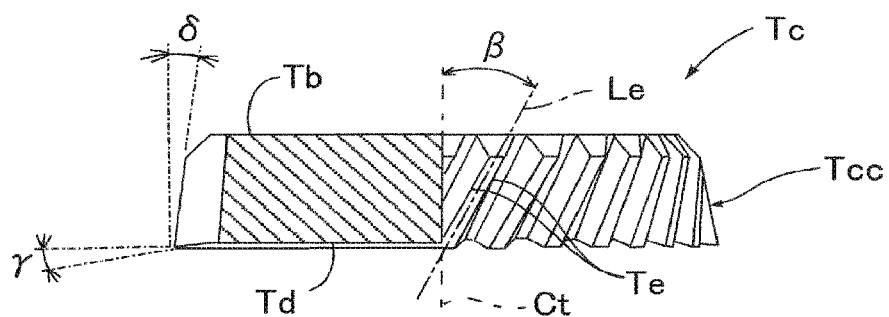
FIG. 5B is a partial cross-sectional view of FIG. 5A as viewed in a radial direction of a blade of the gear cutting tool.

Further, as shown in FIG. 5B, in the blade Tcc, a rake angle inclined by an angle γ with respect to a plane perpendicular to the central axis Ct is provided on a large diameter end side surface Td side, and a front clearance angle inclined by an angle δ with respect to a straight line parallel to the central axis Ct is provided on a tool circumferential side surface side. The blade Tcc has a helix angle in which a straight line Le passing through a center of blade edges Te on both sides is inclined by an angle β with respect to the central axis Ct as viewed in the radial direction.

(5. Method for Designing Gear Cutting Tool)

A method for designing the above-described gear cutting tool T will be described. As also described in the problem to be solved, when the intersection angle θ in the tooth groove machining is small, the cutting speed of the gear cutting tool T may be reduced, and the tool wear may be increased.

The intersection angle θ at which the cutting speed of the gear cutting tool T can be set to an appropriate value in the skiving is preferably from about 20° to about 30° based on machining results. Therefore, the helix angle β of the gear cutting tool T is set to a value based on the intersection angle θ (from about 20° to about 30°). Other tool specifications of the gear cutting tool T are set based on gear specifications of the external gear G. Then, the gear cutting tool T is designed based on other tool specifications of the gear cutting tool T that were set.

Since a machining object is the external gear G, interference between the gear cutting tool T and the workpiece W during machining can be avoided, so that the gear cutting tool T is designed to avoid interference with a jig or the like for supporting the workpiece W. Further, the internal gear can be machined similarly as the machining object, and in this case, the gear cutting tool T is designed to avoid interference between the gear cutting tool T and the workpiece W during machining.

(6. Key Point for Tooth Groove Machining)

Generally, in tooth groove machining of a helical gear, helix angles for the right tooth side surface and the left tooth side surface of the tooth groove are the same, and therefore one correction angle is used for machining. In contrast, in the machining of the tapered tooth groove of the present example, since the taper angle $\Phi_R$ of the right tooth side surface Gsr of the tooth groove Gg is different from the taper angle $\Phi_L$ of the left tooth side surface Gsl, correction angles (referred to as phase correction angles in the present example) corresponding to the taper angles $\Phi_R$ and $\Phi_L$ are respectively used.

The phase correction angle used in the tapered tooth groove machining of the present example is different from the correction angle used in the tooth groove machining of the helical gear, and is not applicable to the tooth groove machining of the helical gear. Specifically, when the correction angle is used, a tooth profile of the helical gear can be machined into a highly accurate involute shape regardless of magnitude of the helix angle of the tooth groove (tooth) of the helical gear. On the other hand, when the phase correction angle is used, the tooth profile of the external gear G is machined into a shape deformed from the involute shape.

However, the taper angle of the tooth groove Gg of the external gear G is relatively small, and it is sufficient for the synchronous cone SC of the present example to synchronize with the sleeve. Therefore, there is no particular problem even if the tooth profile of the external gear G are machined into a shape deformed from the involute shape without requiring machining accuracy of such as the helical gear for the external gear G. As described above, the phase correction angle used in the tapered tooth groove machining of the present example cannot be applied to the tooth groove machining of the helical gear.

Figure 6A:
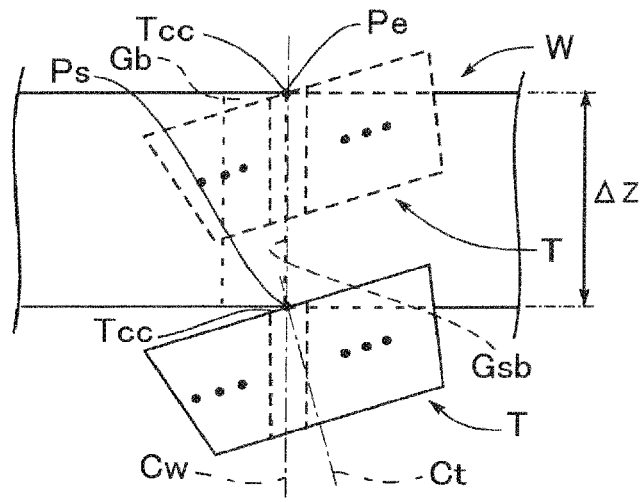
FIG. 6A is a diagram showing an operation of the gear cutting tool during the skiving, and is a diagram of the workpiece as viewed in the radial direction.

The phase correction angle used for the tapered tooth groove machining of the present example is defined as follows. As shown in FIG. 6A, in skiving in which the gear cutting tool T is relatively moved from a start position Ps to an end position Pe (a thickness $\Delta Z$ of the workpiece W) in a direction of the central axis Cw of the workpiece W, the blade Tcc of the gear cutting tool T is positioned at the same position in the start position Ps and the end position Pe.

Here, a reference tooth groove (a predetermined tooth groove) having a reference tooth side surface extending from a machining reference point Pb different from the start position Ps to the end position Pe is set as a portion serving as the tooth groove Gg of the external gear G. The reference tooth side surface in the reference tooth groove has a reference angle. Further, the reference angle takes an intermediate value between the taper angle $\Phi_R$ of the right tooth side surface Gsr and the taper angle $\Phi_L$ of the left tooth side surface Gsl. Therefore, it is possible to easily deal with determination of the machining conditions for the right tooth side surface Gsr and the left tooth side surface Gsl which are left-right symmetrical. The reference tooth groove differs depending on the shape of the tooth groove Gg, and will be described below.

Figure 6B:
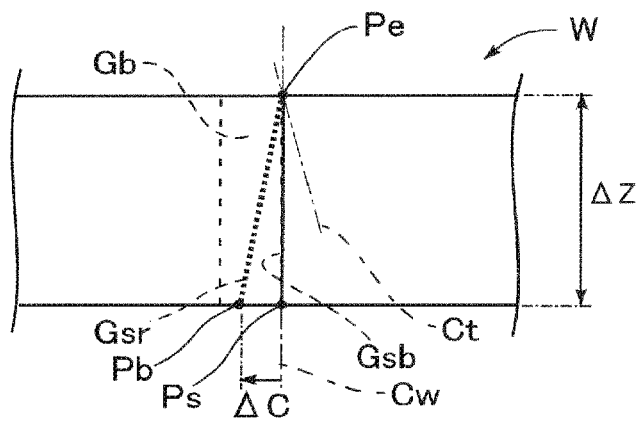
FIG. 6B is a diagram showing a phase correction angle when a groove with a left-right symmetrical tapered shape is machined, and is a diagram as viewed in the radial direction of the workpiece.

First, a case will be described in which the shape of the tooth groove Gg is a tapered shape that is left-right symmetrical with respect to a parallel line of the central axis Cw (a shape in which the taper angle $\Phi_R$ of the right tooth side surface Gsr and the taper angle $\Phi_L$ of the left tooth side surface Gsl have the same absolute value but are different in positive and negative). In the present example, the reference angle of the reference tooth side surface is set to 0° because the reference angle takes a median of the taper angle $\Phi_R$ of the right tooth side surface Gsr and the taper angle $\Phi_L$ of the left tooth side surface Gsl. Therefore, as shown in FIG. 6B, a reference tooth side surface Gsb reaches the end position Pe from the start position Ps. That is, the machining reference point Pb (reference point) is the same with the start position Ps.

Further, in order to machine, for example, the right tooth side surface Gsr of the tapered tooth groove Gg, there is no need to shift the machining reference point Pb in a circumferential direction. That is, there is no need to shift the machining reference point Pb from the start position Ps by a shift amount $\Delta C$. The rotation shift angle of the workpiece W with respect to the gear cutting tool T at this time (synchronization) is defined as a phase correction angle in the skiving. Further, in a case of shifting in the circumferential direction, a machining position of the gear cutting tool T moves as movement of the workpiece W in the direction of the central axis Cw.

Figure 6C:
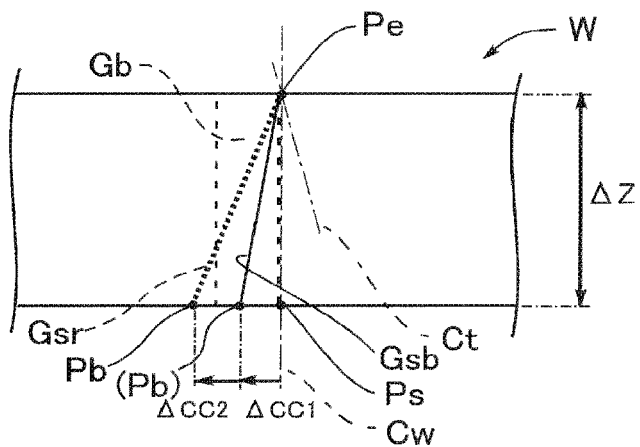
FIG. 6C is a diagram showing a phase correction angle when a groove with a left-right asymmetrical tapered shape is machined, and is a diagram as viewed in the radial direction of the workpiece.

Next, a case will be described in which the shape of the tooth groove Gg is a tapered shape that is left-right asymmetric with respect to a parallel line of the central axis Cw (the taper angle $\Phi_R$ of the right tooth side surface Gsr and the taper angle $\Phi_L$ of the left tooth side surface Gsl have different absolute values and are different in positive and negative). In the present example, the reference angle of the reference tooth side surface is set to a value other than 0° because the reference angle takes the median of the taper angle $\Phi_R$ of the right tooth side surface Gsr and the taper angle $\Phi_L$ of the left tooth side surface Gsl. Therefore, as shown in FIG. 6C, the reference tooth side surface Gsb reaches the end position Pe from the machining reference point Pb (the reference point) that is shifted by a shift amount $\Delta CC1$ in the circumferential direction from the start position Ps. Further, in a case of shifting in the circumferential direction, a machining position of the gear cutting tool T moves as movement of the workpiece W in the direction of the central axis Cw.

Further, in order to machine, for example, the right tooth side surface Gsr of the tapered tooth groove Gg, it is necessary to shift the machining reference point Pb in the circumferential direction. That is, it is necessary to further shift the machining reference point Pb in the circumferential direction by a shift amount $\Delta CC2$. The rotation shift angle of the workpiece W with respect to the gear cutting tool T at this time (synchronization) is defined as a phase correction angle in the skiving. Further, in a case of shifting in the circumferential direction, a machining position of the gear cutting tool T moves as movement of the workpiece W in the direction of the central axis Cw.

Figure 7A:
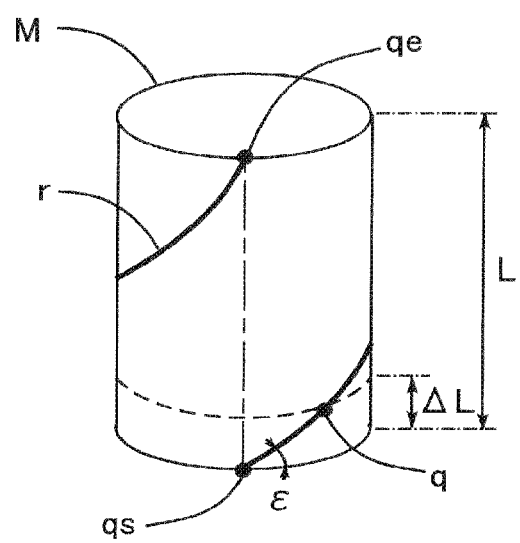
FIG. 7A is a perspective view showing a correction angle of a helical gear and showing a reference cylinder.

Here, in general, as shown in FIG. 7A, for the helical gear, a helix line r having a helix angle $\varepsilon$ on a reference cylinder M advances by only a lead L in a central axis direction of the reference cylinder M for one rotation from a start point qs to an end point qe on the reference cylinder M.

Figure 7B:
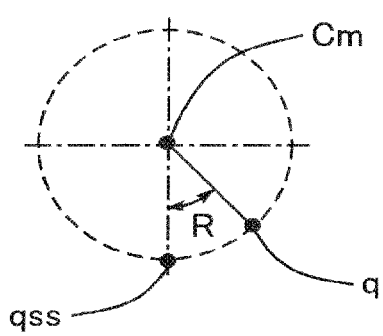
FIG. 7B is a cross-sectional view perpendicular to an axial direction of the reference cylinder of FIG. 7A at a position of ΔL.

Therefore, in a cross section (with reference to FIG. 7B) of the cylinder when a point q on the helix line r advances by a certain distance $\Delta L$ in the central axis direction of the reference cylinder M, an angle formed by the point q, a center Cm of the cylinder, and a projection point qss of the start point qs on the cross section of the cylinder is a correction angle R. The correction angle R can be calculated by Formula (1). mh in Formula (1) is a module of the helical gear, and Th is the number of teeth of the helical gear.

$$R = \frac{360 \cdot \sin(\epsilon) \cdot \Delta L}{\pi \cdot Th \cdot mh} \quad \text{[Formula 1]}$$

Formula (2) using Formula (1) is a formula for calculating a phase correction angle A+α for machining the right tooth side surface Gsr of the tooth groove Gg of the present example. In Formula (2), A is a reference phase correction angle of the reference tooth side surface Gsb, and A+α is a phase correction angle (a first phase correction angle) of the right tooth side surface Gsr, Ψ is a reference angle of the reference tooth side surface, $\Phi_R$ is the taper angle of the right tooth side surface Gsr, ΔZ is a movement amount of the gear cutting tool T from the start position Ps to the end position Pe, m is a module of the external gear G, and T is the number of teeth of the external gear G.

Then, by correcting the rotation angle of the central axis Cw of the workpiece W by the phase correction angle A+α, the right tooth side surface Gsr of the tooth groove Gg can be machined. In the present example, the reference phase correction angle A is 0. The above is also applicable to the calculation of the phase correction angle A−α (a second phase correction angle) of the left tooth side surface Gsl of the tooth groove Gg.

$$A + \alpha = \frac{360 \cdot (\sin(\Psi) + \sin(\phi_R)) \cdot \Delta Z}{\pi \cdot T \cdot m} \quad \text{[Formula 2]}$$

A value obtained by subtracting the reference phase correction angle A from the phase correction angle A+α of the right tooth side surface Gsr and a value obtained by subtracting the reference phase correction angle A from the phase correction angle A−α of the left tooth side surface Gsl have the same absolute value, and signs thereof are opposite. Accordingly, the right tooth side surface Gsr and the left tooth side surface Gsl that are left-right symmetrical can be machined with high accuracy.

(7. Problem in Tooth Groove Machining)

Figure 8A:
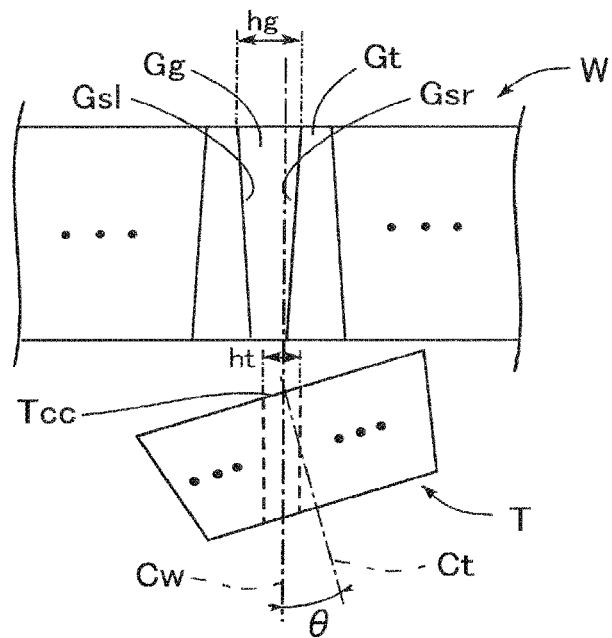
FIG. 8A is a diagram showing a state where there is no uncut portion in the tooth groove machining, as viewed in the radial direction of the workpiece.
Figure 8B:
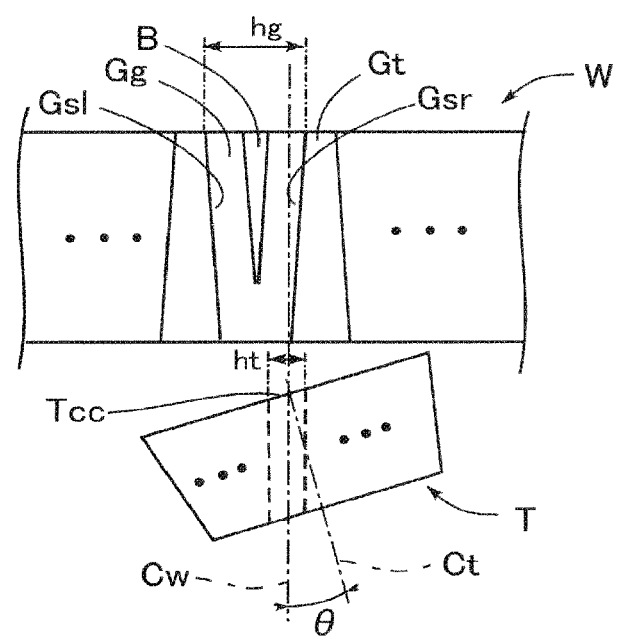
FIG. 8B is a diagram showing a state where there is an uncut portion in the tooth groove machining, as viewed in the radial direction of the workpiece.

In the above-described method for machining the tooth groove, there is a problem about a relationship between a maximum tooth groove width of the tooth groove Gg of the external gear G (a tooth groove width when a tooth width of the tooth Gt is the smallest) and a blade width of the blade Tcc of the gear cutting tool T. As shown in FIG. 8A, when a maximum tooth groove width hg is smaller than twice of a blade width ht, the tooth groove Gg can be brought to a state of having no uncut portion by only the machining of the right tooth side surface Gsr and the left tooth side surface Gsl. However, as shown in FIG. 8B, when the maximum tooth groove width hg is larger than twice of the blade width ht, the machining of the right tooth side surface Gsr and the left tooth side surface Gsl only results in a state where there is an uncut portion B having a triangular prism shape in the tooth groove Gg.

In this case, before the right tooth side surface Gsr and the left tooth side surface Gsl are machined, it is necessary to perform groove machining of a reference tooth groove Gb having the reference tooth side surface Gsb with respect to a portion serving as the tooth groove Gg of the workpiece W on the outer circumference thereof. The reference angle ψ of the reference tooth side surface Gsb takes an intermediate value of the taper angle $\Phi_R$ of the right tooth side surface Gsr and the taper angle $\Phi_L$ of the left tooth side surface Gsl.

Figure 9:
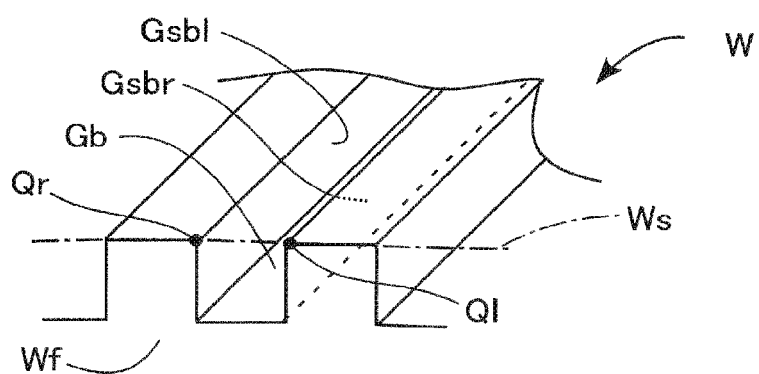
FIG. 9 is a diagram showing calculating of respective machining start positions on a right tooth side surface and a left tooth side surface in a reference tooth groove.

Further, as shown in FIG. 9, an intersection point between an outer circumference Ws of a machining start side end side surface Wf of the workpiece W and the reference right tooth side surface Gsbr of the reference tooth groove Gb is detected as a right tooth side surface reference point Qr by a position detection sensor (not shown) such as an eddy current touch sensor. Further, a machining start position of the right tooth side surface Gsr is calculated based on a shift amount of a formation position of the right tooth side surface Gsr from the right tooth side surface reference point Qr. Thus, the accuracy of the machining start position of the right tooth side surface Gsr can be improved. Then, the gear cutting tool T is positioned at the machining start position of the right tooth side surface Gsr so as to machine the right tooth side surface Gsr.

Similarly, an intersection point between the outer circumference Ws of the machining start side end side surface Wf of the workpiece W and a reference left tooth side surface Gsbl of the reference tooth groove Gb is detected as a left tooth side surface reference point Ql. Further, a machining start position of the left tooth side surface Gsl is calculated based on a shift amount of a formation position of the left tooth side surface Gsl from the left tooth side surface reference point Qr. Thus, the accuracy of the machining start position of the left tooth side surface Gsl can be improved. Then, the gear cutting tool T is positioned at the machining start position of the left tooth side surface Gsl so as to machine the left tooth side surface Gsl. Thus, the tooth groove Gg can be brought into a state where there is no uncut portion B. The groove machining of the reference tooth groove Gb may be performed after the right tooth side surface Gsr and the left tooth side surface Gsl are machined.

(8. Tooth Groove Machining Conditions)

In the method for machining the tooth groove, tooth grooving machining conditions for performing the machining by skiving are determined, and the tooth groove is machined by skiving based on the determined machining conditions. Specific examples of the tooth groove machining conditions will be described in the present example (a case where the reference tooth groove Gb is not machined (a first example), and a case where the reference tooth groove Gb is machined (a second example)), in a case of machining with two types of related-art gear cutting tools (a first comparative example), and in a case of machining with one type of related-art gear cutting tool (a second comparative example).

Figures 10A, 10B:
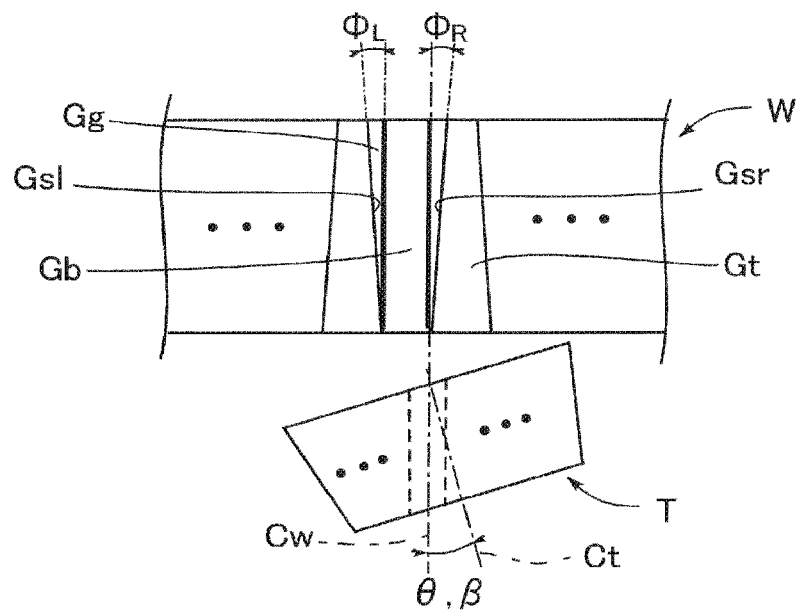
FIG. 10A is a diagram showing a left-right symmetrical tapered shape as viewed in the radial direction of the workpiece.
FIG. 10B is a table showing an example of specifications of tooth surfaces of FIG. 10A.

First, as shown in FIG. 10A, a case will be described in which the shape of the tooth groove Gg is left-right symmetrical with respect to a parallel line of the central axis Cw (a shape in which the taper angle $\Phi_R$ of the right tooth side surface Gsr and the taper angle $\Phi_L$ of the left tooth side surface Gsl have the same absolute value, but are different in positive and negative). As shown in FIG. 10B, as specifications of the tooth surface of the tooth groove Gg of the external gear G, the taper angle $\Phi_R$ of the right tooth side surface Gsr is +3°, the taper angle $\Phi_L$ of the left tooth side surface Gsl is −3°, and the reference angle ψ of the reference tooth groove Gb is 0° because the reference angle takes a median of the taper angle $\Phi_R$ of the right tooth side surface Gsr and the taper angle $\Phi_L$ of the left tooth side surface Gsl.

As shown in FIG. 10C, a tool type for machining the right tooth side surface Gsr and the left tooth side surface Gsl is common in the first example and the second example, the tool type is for left using and for right using in the first comparative example, and the tool type is common in the second comparative example. The intersection angle θ, the tool helix angle β, and the phase correction angle when the right tooth side surface Grs is machined are 20°, 20°, A1+α1 (A1=0) in the first example and the second example, are 20°, 23°, B (B≠0) in the first comparative example, and are 3°, 0°, C (C≠0) in the second comparative example. The intersection angle θ, the tool helix angle β, and the phase correction angle when the left tooth side surface Gsl is machined are 20°, 20°, A1−α2 (A1=0, α1=α2) in the first example and the second example, are −20°, −23°, −B (B≠0) in the first comparative example, and are −3°, 0°, −C (C≠0) in the second comparative example.

Therefore, since the machining may be performed with one type of gear cutting tool in the first and second examples and the second comparative example, as compared to the first comparative example, the increase in the tool cost and occurrence of machining error caused by tool replacement can be prevented. Further, as compared with the second comparative example, the intersection angle can be increased in the first example and the second example, and further, there is no need to change the intersection angle, and thus an increase in tool wear and tact time can be prevented.

Figures 11A, 11B:
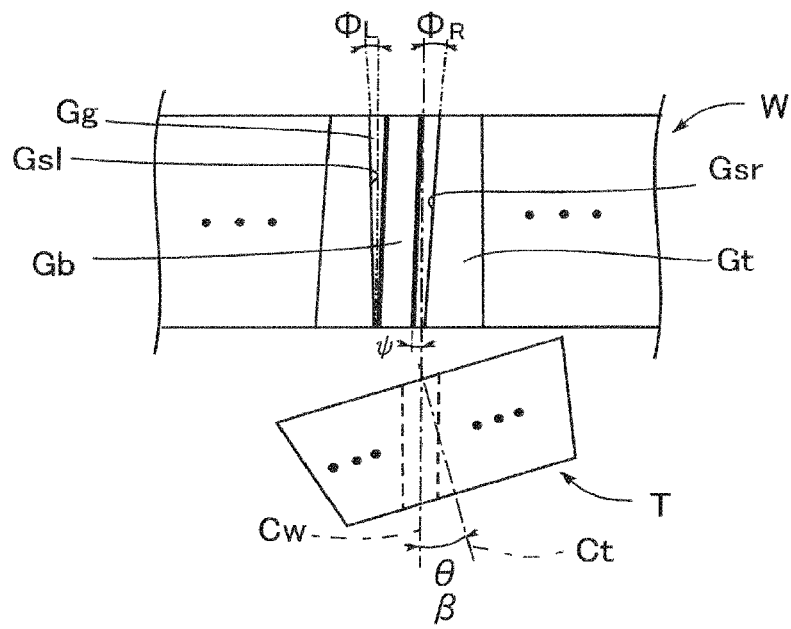
FIG. 11A is a diagram of a left-right asymmetrical tapered shape as viewed in the radial direction of the workpiece.
FIG. 11B is a table showing an example of specifications of the tooth surfaces of FIG. 11A.

Next, as shown in FIG. 11A, a case will be described in which the shape of the tooth groove Gg is a tapered shape that is left-right asymmetrical with respect to a parallel line of the central axis Cw (a shape in which the taper angle $\Phi_R$ of the right tooth side surface Gsr and the taper angle $\Phi_L$ of the left tooth side surface Gsl have different absolute values and are different in positive and negative). As shown in FIG. 11B, as specifications of the tooth surface of the tooth groove Gg of the external gear G, the taper angle $\Phi_R$ of the right tooth side surface Gsr is +3°, the taper angle $\Phi_L$ of the left tooth side surface Gsl is −2°, and the reference angle ψ of the reference tooth groove Gb is +0.5° because the reference angle takes a median of the taper angle $\Phi_R$ of the right tooth side surface Gsr and the taper angle $\Phi_L$ of the left tooth side surface Gsl.

As shown in FIG. 11C, a tool type for machining the right tooth side surface Gsr and the left tooth side surface Gsl is common in the first example and the second example, the tool type is for left using and for right using in the first comparative example, and the tool type is common in the second comparative example. The intersection angle θ, the tool helix angle β, and the phase correction angle when the right tooth side surface Grs is machined are 20.5°, 20.5°, A2+α3 (A2≠0) in the first example or the second example, are 20°, 20°, A3+α5 (A3=0) in another example of the first example and the second example, are 20°, 23°, E (E≠0) in the first comparative example, and are 3°, 0°, G (G≠0) in the second comparative example. The intersection angle θ, the tool helix angle β, and the phase correction angle when the left tooth side surface Gsl is machined are 20.5°, 20.5°, A2−α4 (A2≠0, α3=α4) in the first example or the second example, are 20°, 20°, A3−α6 (A3=0, α5≠α6) in another example of the first example and the second example, are −20°, −22°, −F (F≠0) in the first comparative example, and are −2°, 0°, −H (H≠0) in the second comparative example.

Therefore, since the machining may be performed with one type of gear cutting tool in the first and second examples and the second comparative example, as compared to the first comparative example, the increase in the tool cost and occurrence of machining error caused by tool replacement can be prevented. Further, as compared with the second comparative example, the intersection angle can be increased in the first example and the second example, and further, there is no need to change the intersection angle, and thus an increase in tool wear and tact time can be prevented.

(9. Configuration of Machining Control Unit 13)

Figure 12:
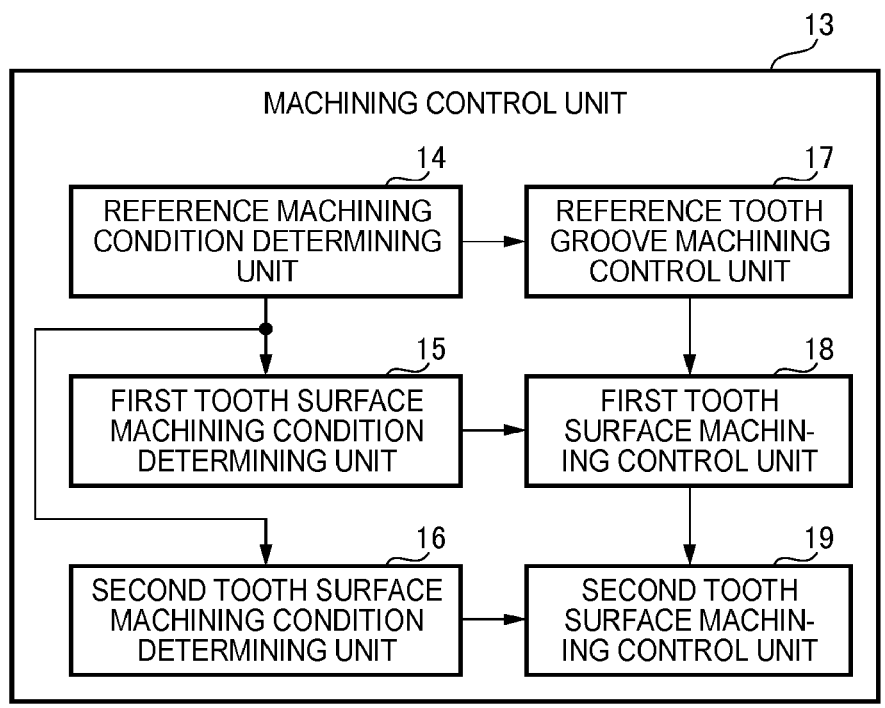
FIG. 12 is a diagram showing a configuration of a machining control unit of a tooth groove machining device.

As shown in FIG. 12, the machining control unit 13 of the tooth groove machining device 10 includes a reference machining condition determining unit 14, a first tooth side surface machining condition determining unit 15, a second tooth side surface machining condition determining unit 16, a reference tooth groove machining control unit 17, a first tooth side surface machining control unit 18, and a second tooth side surface machining control unit 19. The reference machining condition determining unit 14 determines reference machining conditions which are conditions for machining the reference tooth groove Gb having the reference angle ψ by skiving and in which the intersection angle θ is set to a predetermined intersection angle and a phase correction angle is set to a reference phase correction angle that is different from the phase correction angle of the right tooth side surface Gsr and the phase correction angle of the left tooth side surface Gsl.

The first tooth side surface machining condition determining unit 15 determines, based on the reference machining conditions determined by the reference machining condition determining unit 14, right tooth side surface machining conditions which are conditions for machining the right tooth side surface Gsr by skiving and in which the intersection angle θ is set to the predetermined intersection angle and the phase correction angle is set to the phase correction angle of the right tooth side surface Grs (a first phase correction angle). The second tooth side surface machining condition determining unit 16 determines, based on the reference machining conditions determined by the reference machining condition determining unit 14, left tooth side surface machining conditions which are conditions for machining the left tooth side surface Gsl by skiving and in which the intersection angle θ is set to the predetermined intersection angle and the phase correction angle is set to the phase correction angle of the left tooth side surface Grl (a second phase correction angle).

The reference tooth groove machining control unit 17 sets, based on the reference machining conditions determined by the reference machining condition determination unit 14, the intersection angle θ to the predetermined intersection angle and the phase correction angle to the reference phase correction angle, so as to control the gear cutting tool T to machine the reference tooth groove Gb having the reference angle ψ by skiving. The first tooth side surface machining control unit 18 sets, based on the right tooth side surface machining conditions determined by the first tooth side surface machining condition determining unit 15, the intersection angle θ to be the same as the predetermined intersection angle, and the phase correction angle to the phase correction angle of the right tooth side surface Gsr, so as to control a gear cutting tool T that is the same as the gear cutting tool T for machining the reference tooth groove Gb to machine the right tooth side surface Gsr by skiving.

The second tooth side surface machining control unit 19 sets, based on the left tooth side surface machining conditions determined by the second tooth side surface machining condition determining unit 16, the intersection angle θ to be the same as the predetermined intersection angle, and the phase correction angle to the phase correction angle of the left tooth side surface Gsl different from the phase correction angle of the right tooth side surface Gsr, so as to control a gear cutting tool T that is the same as the gear cutting tool T for machining the right tooth side surface Gsr to machine the left tooth side surface Gsl by skiving.

According to the tooth groove machining device 10, when the right tooth side surface Gsr of the tooth groove Gg is machined, the machining reference point Pb of the right tooth side surface Gsr is shifted in the circumferential direction of the workpiece W by the phase correction angle of the right tooth side surface Gsr. When the left tooth side surface Gsl is machined, the machining reference point of the left tooth side surface Gsl is shifted in the circumferential direction of the workpiece W by the phase correction angle of the left tooth side surface Gsl. Thus, even when the taper angle Φ of the tooth groove Gg is small, by shifting the machining point with respect to a tooth trace (a tooth surface), machining can be performed with one type of gear cutting tool T (without changing tools) while ensuring a sufficiently large intersection angle θ. Therefore, the tool wear can be reduced, and the tool cost can be reduced. Further, the facing tooth side surfaces Gsr and Gsl of the tooth groove Gg can be machined without changing the intersection angle θ. Therefore, the tact time can be reduced.

(10. Operation of Machining Control Unit 13)

Figure 13:
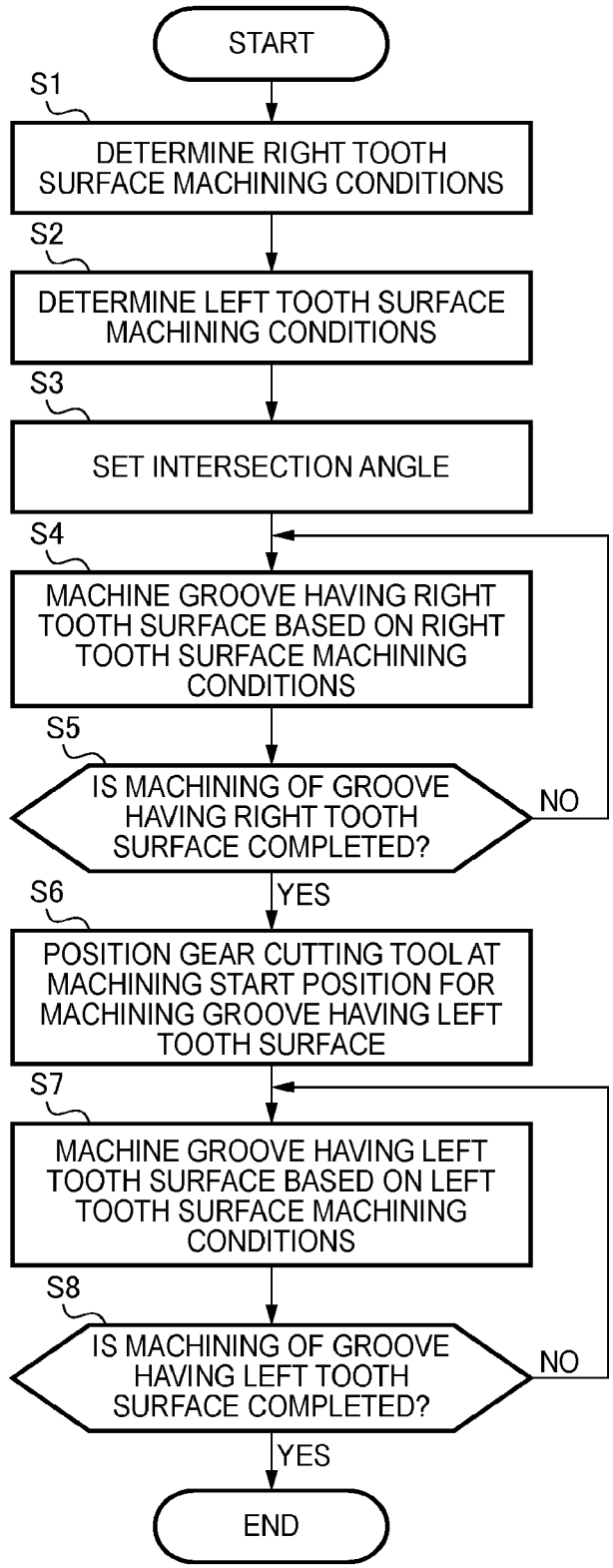
FIG. 13 is a flowchart showing operations of the machining control unit when a reference tooth groove is not machined.

As operations of the machining control unit 13, a case in which the reference tooth groove Gb is not machined will be described with reference to a flowchart of FIG. 13 and operation diagrams of FIGS. 14A to 14C. The machining control unit 13 determines the right tooth side surface machining conditions such as the predetermined intersection angle θ and the phase correction angle of the right tooth side surface Gsr for machining the right tooth side surface Gsr (step S1, a first tooth side surface machining condition determining step).

Further, the machining control unit 13 determines the left tooth side surface machining conditions such as the predetermined intersection angle θ in the right tooth side surface machining conditions and the phase correction angle of the left tooth side surface Gsl for machining the left tooth side surface Gsl (step S2, a second tooth side surface machining condition determining step). Then, the machining control unit 13 sets a state of having the predetermined intersection angle θ (step S3).

Figure 14A:
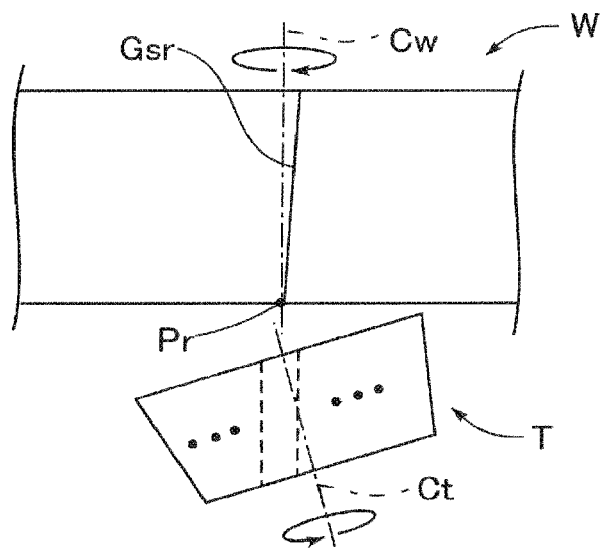
FIG. 14A is a diagram showing a state where the right tooth side surface is machined when the reference tooth groove is not machined, as viewed in the radial direction of the workpiece.

Then, as shown in FIG. 14A, the machining control unit 13 controls relative movement between the gear cutting tool T and the workpiece W, that rotate synchronously, in the direction of the central axis Cw of the workpiece W while controlling rotation of the workpiece W using the phase correction angle of the right tooth side surface Gsr in the right tooth side surface machining conditions, and thus a groove having a right tooth side surface Gsr is machined on the workpiece W by the gear cutting tool T from a certain machining start position Pr (step S4, a first tooth side surface machining step).

The machining control unit 13 determines whether or not the machining of the groove having the right tooth side surface Gsr is completed (step S5) and if the machining of the groove having the right tooth side surface Gsr is not completed (step S5: No), the flow returns to step S4 to repeat the above-described processing. If the machining of the groove having the right tooth side surface Gsr is completed (step S5: Yes), the rotation of the workpiece W is stopped, and the relative movement between the gear cutting tool T and the workpiece W is stopped.

Figure 14B:
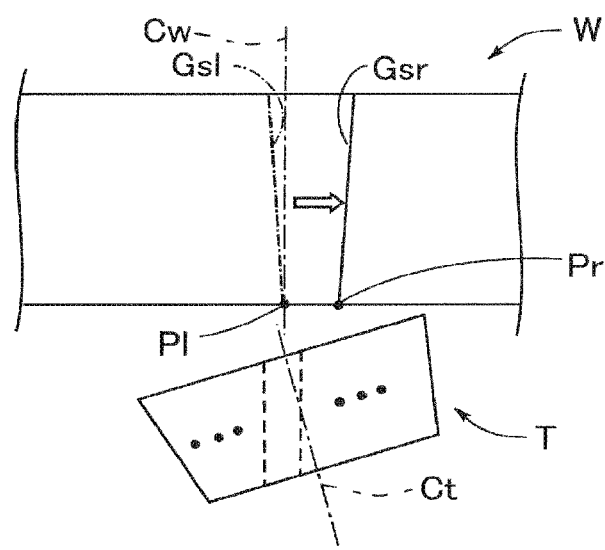
FIG. 14B is a diagram showing calculating of a machining start position on the left tooth side surface when the reference tooth groove is not machined, as viewed in the radial direction of the workpiece.
Figure 14C:
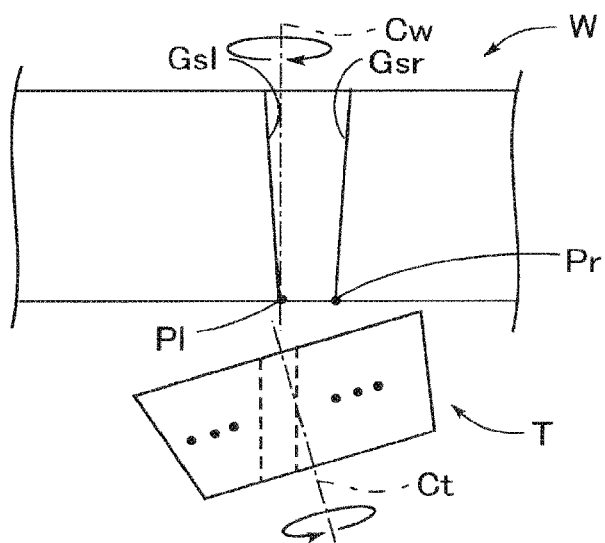
FIG. 14C is a diagram showing a state where the left tooth side surface is machined when the reference tooth groove is not machined, as viewed in the radial direction of the workpiece.

Then, as shown in FIG. 14B, the machining control unit 13 rotates the workpiece W in a direction indicated by an arrow in the figure by a separation angle σ (stored in advance) of the facing right tooth side surface Gsr and left tooth side surface Gsl in the workpiece W around the central axis Cw of the workpiece W, and determines a machining start position Pl for machining the grooving having the left tooth side surface Gsl. Then, the gear cutting tool T is positioned at the determined machining start position Pl for machining the groove having the left tooth side surface Gsl (step S6).

The machining control unit 13 controls the relative movement between the gear cutting tool T and the workpiece W, that rotate synchronously, in the direction of the central axis Cw of the workpiece W while controlling rotation of the workpiece W using the phase correction angle of the left tooth side surface Gsl with the predetermined intersection angle θ remaining as it is, and thus a groove having the left tooth side surface Gsl is machined on the workpiece W by the gear cutting tool T (step S7, a second tooth side surface machining step).

The machining control unit 13 determines whether or not the machining of a groove having the left tooth side surface Gsl is completed (step S8), and if the machining of the groove having the left tooth side surface Gsl is not completed (step S8: No), the flow returns to step S7 to repeat the above-described processing. If the machining of the groove having the left tooth side surface Gsl is completed (step S8: Yes), the rotation of the workpiece W is stopped, the relative movement between the gear cutting tool T and the workpiece W is stopped, and all processing is completed. Thus, a tapered tooth groove Gg having no uncut portion B in the tooth groove Gg can be obtained.

Figure 15A:
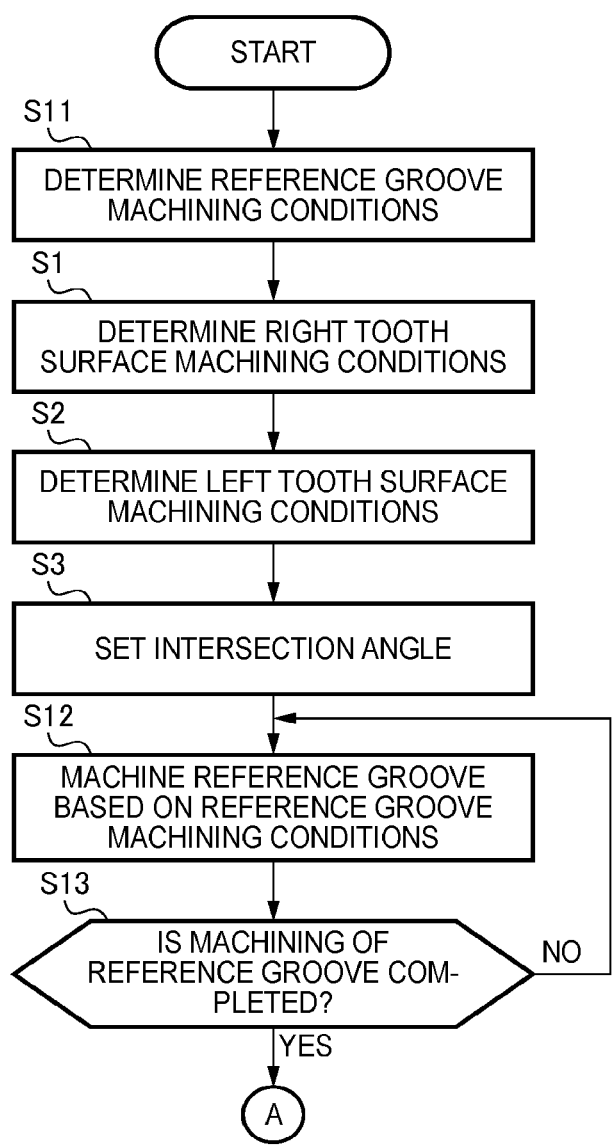
FIG. 15A is a flowchart showing a first half of operations of the machining control unit when the reference tooth groove is machined.

As operations of the machining control unit 13, a case in which the reference tooth groove Gb is machined will be described with reference to a flowchart of FIGS. 15A and 15B and operation diagrams of FIGS. 16A and 16B. In FIG. 15, the same operations as those in the flowchart of FIG. 13 are denoted by the same reference numerals, and detailed descriptions thereof are omitted. The machining control unit 13 determines the reference machining conditions such as the predetermined intersection angle θ and the reference phase correction angle for machining the reference tooth groove Gb (step S11, a reference machining condition determining step). Then, the machining control unit 13 determines the right tooth side surface machining conditions and the left tooth side surface machining conditions (steps S1 and S2), and sets a state of having the predetermined intersection angle θ (step S3).

The machining control unit 13 controls relative movement between the gear cutting tool T and the workpiece W, that rotate synchronously, in the direction of the central axis Cw of the workpiece W while controlling rotation of the workpiece W using the phase correction angle of the reference tooth groove Gb based on the determined reference machining conditions, and thus the reference tooth groove Gb is machined on the workpiece W by the gear cutting tool T from a certain machining start position (step S12, a reference tooth groove machining step).

The machining control unit 13 determines whether or not the machining of the reference tooth groove Gb is completed (step S13), and if the machining of the reference tooth groove Gb is not completed (step S13: No), the flow returns to step S12 to repeat the above-described processing. If the machining of the reference tooth groove Gb is completed (step S13: Yes), the rotation of the workpiece W is stopped, and the relative movement between the gear cutting tool T and the workpiece W is stopped.

Figure 15B:
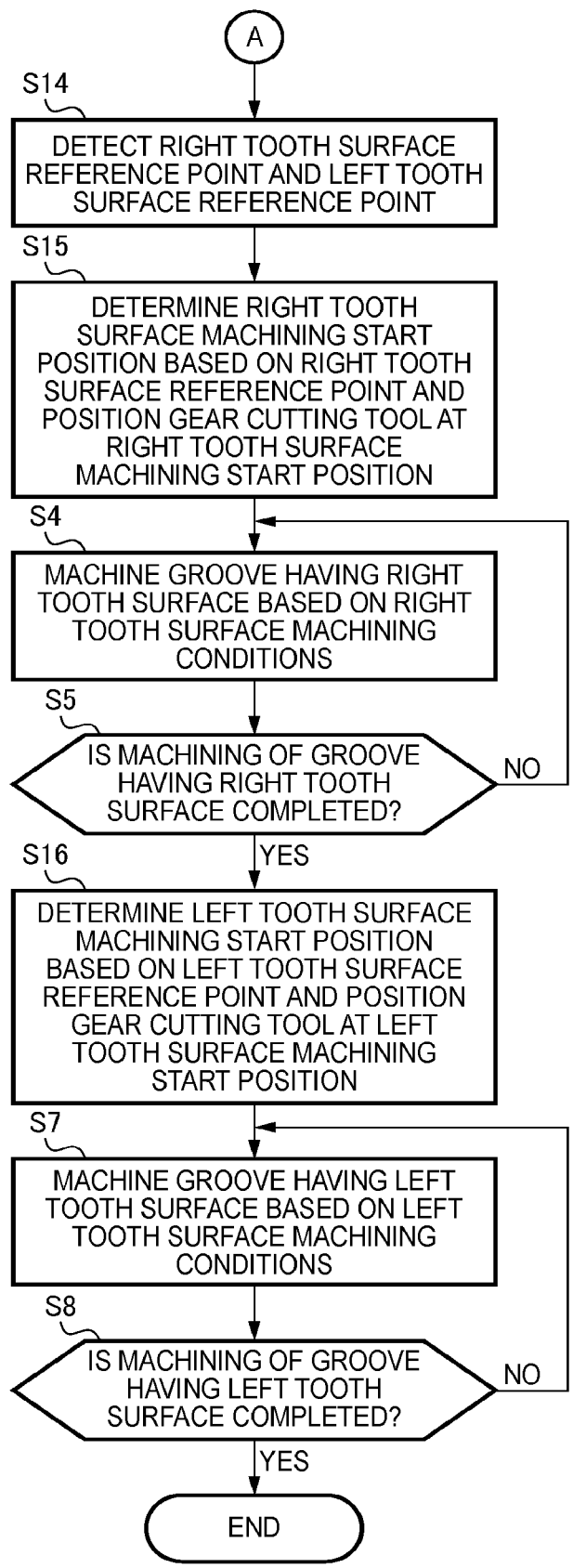
FIG. 15B is a flowchart showing a latter half of the operations of the machining control unit when the reference tooth groove is machined.
Figure 16A:
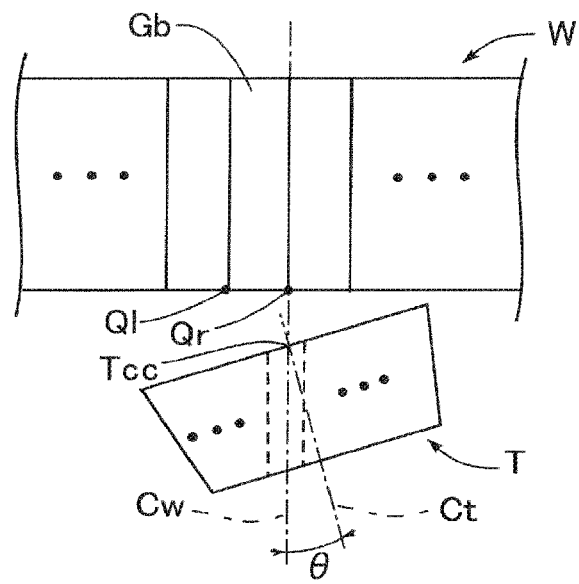
FIG. 16A is a diagram showing left and right tooth side surface reference points for determining the machining start positions of the left and right tooth side surfaces when the reference tooth groove is machined, as viewed in the radial direction of the workpiece.
Figure 16B:
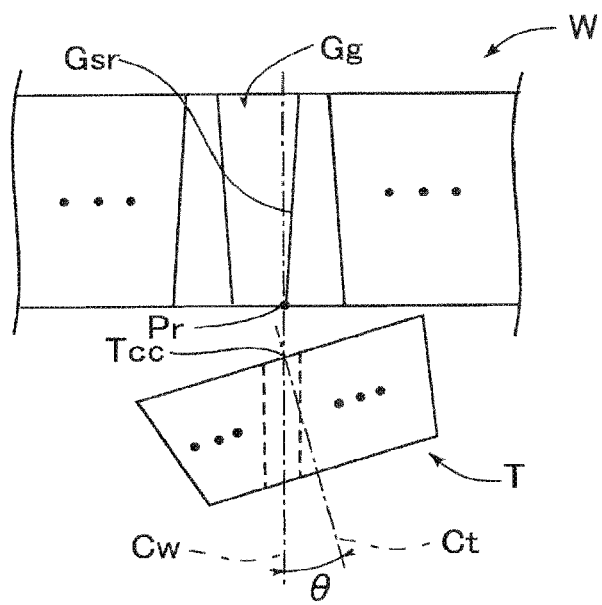
FIG. 16B is a diagram showing a state where the right tooth side surface is machined from a machining start position on the right tooth side surface when the reference tooth groove is machined, as viewed in the radial direction of the workpiece.

Then, as shown in FIG. 15B, the machining control unit 13 detects the right tooth side surface reference point Qr and the left tooth side surface reference point Ql by a position detection sensor (not shown) (step S14). Then, the machining control unit 13 determines the machining start position Pr of the right tooth side surface Gsr based on the right tooth side surface reference point Qr, and positions the gear cutting tool T at the machining start position Pr of the right tooth side surface Gsr (step S15). Then, the machining control unit 13 performs machining of a groove having the right tooth side surface Gsr on the workpiece W by the gear cutting tool T with the predetermined intersection angle θ as it is (step S4, the first tooth side surface machining step).

The machining control unit 13 determines whether or not the machining of the groove having the right tooth side surface Gsr is completed (step S5), and if the machining of the groove having the right tooth side surface Gsr is not completed (step S5: No), the flow returns to step S4 to repeat the above-described processing. If the machining of the groove having the right tooth side surface Gsr is completed (step S5: Yes), the rotation of the workpiece W is stopped, and the relative movement between the gear cutting tool T and the workpiece W is stopped.

Then, the machining control unit 13 determines a machining start position of the left tooth side surface Gsl based on the left tooth side surface reference point Ql, and positions the gear cutting tool T at the machining start position of the left tooth side surface Gsl (step S16). Then, the machining control unit 13 performs machining of a groove having the left tooth side surface Gsl on the workpiece W by the gear cutting tool T with the predetermined intersection angle θ as it is (step S7, the second tooth side surface machining step).

The machining control unit 13 determines whether or not the machining of the groove having the left tooth side surface Gsl is completed (step S8), and if the machining of the groove having the left tooth side surface Gsl is not completed (step S8: No), the flow returns to step S7 to repeat the above-described processing. If the machining of the groove having the left tooth side surface Gsl is completed (step S8: Yes), the rotation of the workpiece W is stopped, the relative movement between the gear cutting tool T and the workpiece W is stopped, and all processing is completed. Thus, a tapered tooth groove Gg having no uncut portion B in the tooth groove Gg can be obtained.

What is claimed is:

1. A tooth groove machining method for machining a tooth groove on a workpiece by skiving with a gear cutting tool, the workpiece being configured such that:
    a first tooth side surface of the tooth groove includes a first taper angle with respect to a line parallel to a central axis of the workpiece; and
    a second tooth side surface of the tooth groove facing the first tooth side surface includes a second taper angle different from the first taper angle,
    the method comprising:
    defining a shift angle as a phase correction angle in the skiving when shifting a reference point of a predetermined tooth groove of the workpiece in a circumferential direction of the workpiece;
    machining the first tooth side surface by the skiving with the gear cutting tool, by setting an intersection angle between the line parallel to the central axis of the workpiece and a central axis of the gear cutting tool to a predetermined intersection angle, and by setting the phase correction angle to a first phase correction angle;
    machining the second tooth side surface by the skiving with the same gear cutting tool as the gear cutting tool that machined the first tooth side surface, by setting the intersection angle to be the same as the predetermined intersection angle, and by setting the phase correction angle to a second phase correction angle different from the first phase correction angle;
    defining an intermediate value between the first taper angle and the second taper angle as a reference angle; and
    machining a reference tooth groove having the reference angle by the skiving with the same gear cutting tool as the gear cutting tool that machined the first tooth side surface, by setting the intersection angle to be the same as the predetermined intersection angle, and by setting the phase correction angle to a reference phase correction angle different from the first phase correction angle and the second phase correction angle,
    wherein the machining of the first tooth side surface and the machining of the second tooth side surface are performed after the machining of the reference tooth groove.

2. The tooth groove machining method according to claim 1, wherein the reference angle is a median of the first taper angle and the second taper angle.

3. The tooth groove machining method according to claim 1, wherein the reference angle is 0°.

4. A tooth groove machining method for machining a tooth groove on a workpiece by skiving with a gear cutting tool, the workpiece being configured such that:
    a first tooth side surface of the tooth groove includes a first taper angle with respect to a line parallel to a central axis of the workpiece; and
    a second tooth side surface of the tooth groove facing the first tooth side surface includes a second taper angle different from the first taper angle,
    the method comprising:
    defining a shift angle as a phase correction angle in the skiving when shifting a reference point of a predetermined tooth groove of the workpiece in a circumferential direction of the workpiece;
    machining the first tooth side surface by the skiving with the gear cutting tool, by setting an intersection angle between the line parallel to the central axis of the workpiece and a central axis of the gear cutting tool to a predetermined intersection angle, and by setting the phase correction angle to a first phase correction angle;
    machining the second tooth side surface by the skiving with the same gear cutting tool as the gear cutting tool that machined the first tooth side surface, by setting the intersection angle to be the same as the predetermined intersection angle, and by setting the phase correction angle to a second phase correction angle different from the first phase correction angle;
    defining an intermediate value between the first taper angle and the second taper angle as a reference angle;
    determining a reference machining condition for machining a reference tooth groove having the reference angle by the skiving, the reference tooth groove having the reference angle being different from the tooth groove having the first tooth side surface and the second tooth side surface, and the reference machining condition being configured such that the intersection angle is set to the predetermined intersection angle, and that the phase correction angle is set to a reference phase correction angle different from the first phase correction angle and the second phase correction angle;
    determining, based on the reference machining condition, a first tooth side surface machining condition for machining the first tooth side surface by the skiving, the first tooth side surface machining condition being configured such that the intersection angle is set to the predetermined intersection angle, and that the phase correction angle is set to the first phase correction angle; and determining, based on the reference machining condition, a second tooth side surface machining condition for machining the second tooth side surface by the skiving, the second tooth side surface machining condition being configured such that the intersection angle is set to the predetermined intersection angle, and that the phase correction angle is set to the second phase correction angle, wherein the machining of the first tooth side surface is performed based on the first tooth side surface machining condition, and wherein the machining of the second tooth side surface is performed based on the second tooth side surface machining condition.

5. The tooth groove machining method according to claim 4, wherein a value obtained by subtracting the reference phase correction angle from the first phase correction angle and a value obtained by subtracting the reference phase correction angle from the second phase correction angle have opposite signs with each other, and the values have the same absolute value with each other.

\* \* \* \* \*